US012481779B2

(12) United States Patent
Singh et al.

(10) Patent No.: US 12,481,779 B2
(45) Date of Patent: Nov. 25, 2025

(54) QUERY PROCESSING SYSTEM AND METHOD

(71) Applicant: Hitachi, Ltd., Tokyo (JP)

(72) Inventors: Divya Singh, Tokyo (JP); Satoshi Katsunuma, Tokyo (JP); Toshihiko Kashiyama, Tokyo (JP); Mika Takata, Tokyo (JP); Prashant Kumar Sharma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 157 days.

(21) Appl. No.: 18/244,407

(22) Filed: Sep. 11, 2023

(65) Prior Publication Data

US 2024/0086564 A1 Mar. 14, 2024

(30) Foreign Application Priority Data

Sep. 13, 2022 (JP) ................ 2022-145621

(51) Int. Cl.
G06F 21/00 (2013.01)
G06F 21/62 (2013.01)

(52) U.S. Cl.
CPC .............. G06F 21/6227 (2013.01)

(58) Field of Classification Search
None
See application file for complete search history.

(56) References Cited

U.S. PATENT DOCUMENTS

| | | | |
|---|---|---|---|
| 9,253,051 B2 * | 2/2016 | Phillips ................ | H04L 41/147 |
| 9,578,060 B1 * | 2/2017 | Brisebois ............. | G06N 20/00 |
| 10,579,619 B2 * | 3/2020 | Arthanarisamy ........... | |
| | | | G06F 16/24542 |
| 11,151,269 B2 * | 10/2021 | Mathur ............... | G06F 21/6218 |
| 11,677,706 B1 * | 6/2023 | Chinnalagu ........... | G06N 20/00 |
| | | | 709/206 |
| 11,848,949 B2 * | 12/2023 | Datar ................ | G06F 16/90335 |
| 2007/0006294 A1 * | 1/2007 | Hunter ............... | H04L 63/1441 |
| | | | 726/1 |
| 2009/0077621 A1 * | 3/2009 | Lang ..................... | H04L 63/10 |
| | | | 726/1 |
| 2015/0150075 A1 * | 5/2015 | Vahlis ................. | H04L 63/0428 |
| | | | 726/1 |
| 2015/0302420 A1 | 10/2015 | Nair | |
| 2016/0065555 A1 * | 3/2016 | Branden ............ | H04L 63/0807 |
| | | | 726/7 |

(Continued)

*Primary Examiner* — Maung T Lwin
(74) *Attorney, Agent, or Firm* — MATTINGLY & MALUR, PC

(57) ABSTRACT

To improve resource utilization efficiency of query compliance check, which is check as to whether a query complies with a restriction imposed on data. The query compliance check is roughly divided into data flow policy check as to whether a data flow policy that defines a restriction on data transfer within a county or between countries is complied with, and organization rule check as to whether an organization rule that defines a restriction on sharing outside an organization is complied with, which are hierarchically configured. By analyzing a received query, a system identifies one or more data items as target input/output (I/O) data according to the query, and executes the data flow policy check on the identified one or more data items. When a result of the data flow policy check is false, the system returns a result that the query is compliance violation without executing the organization rule check.

10 Claims, 10 Drawing Sheets

(56) References Cited

U.S. PATENT DOCUMENTS

| | | |
|---|---|---|
| 2019/0228171 A1 | 7/2019 | Mathur |
| 2020/0296007 A1* | 9/2020 | Finn, II ................. H04L 41/145 |
| 2023/0061234 A1* | 3/2023 | Calado ................. G06F 21/577 |

* cited by examiner

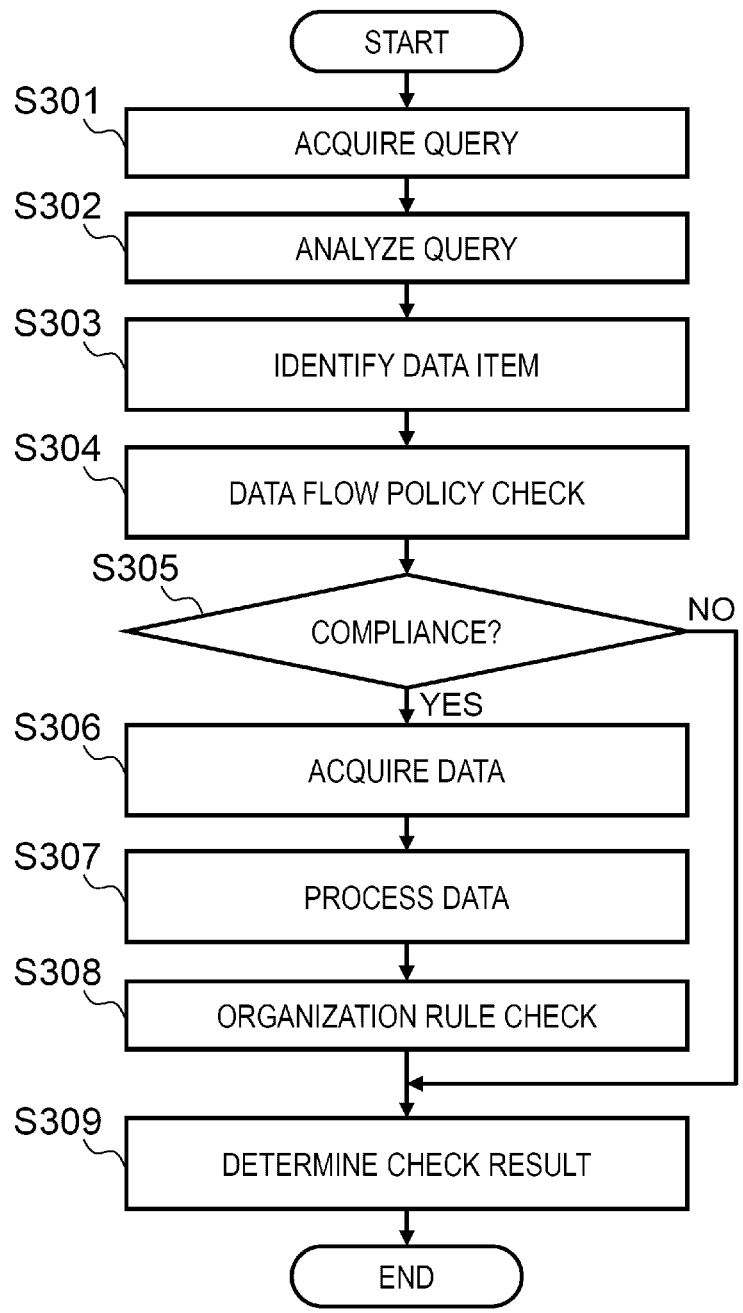

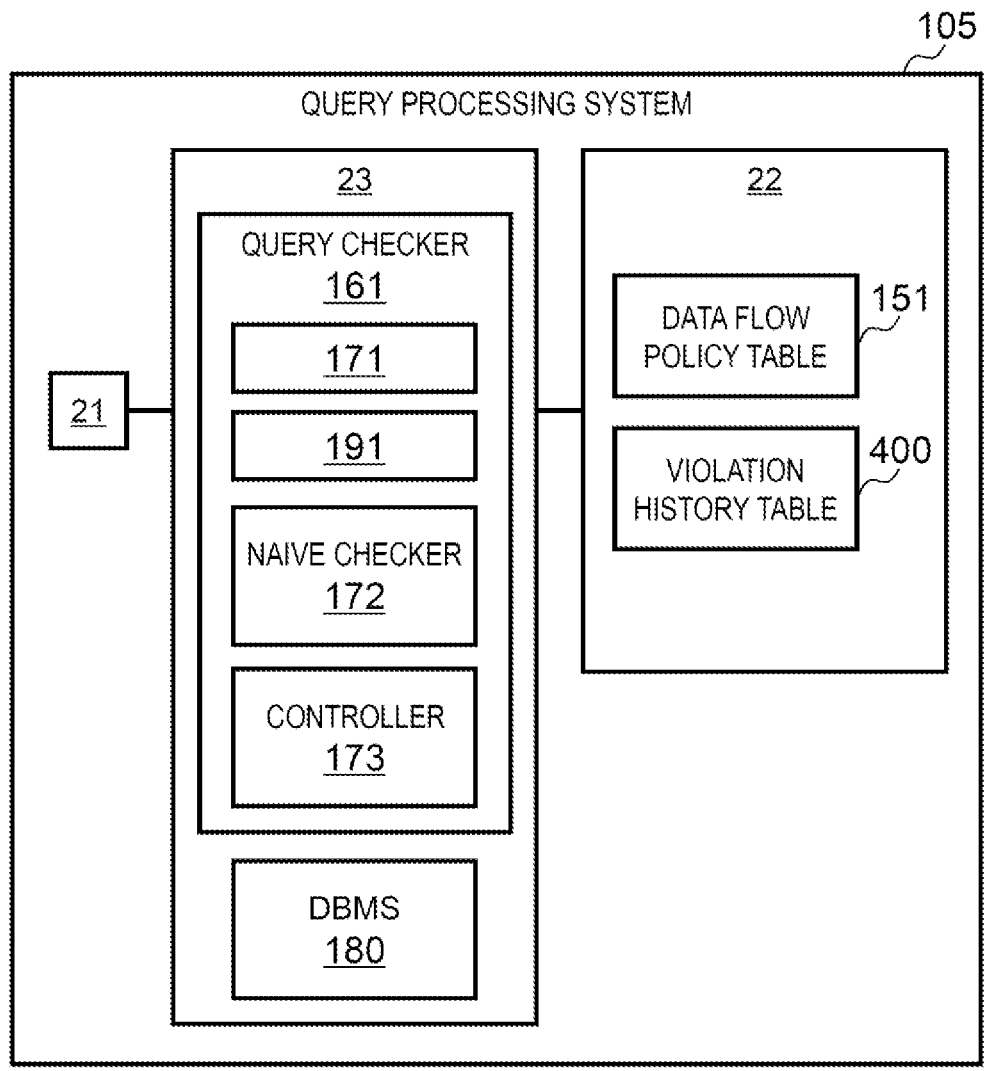

USER INTENTION TABLE
800

| VARIATION | $M_1 M_2$ | USER INTENTION |
|---|---|---|
| HIERARCHY CHECKER | 00 | |
| NAIVE CHECKER | 11 | |
| ONLY DATA FLOW POLICY CHECK | 01 | ✓ |
| ONLY ORGANIZATION RULE CHECK | 10 | |

QUERY PROCESSING SYSTEM AND METHOD

CROSS-REFERENCE TO RELATED APPLICATION

The present application claims priority from Japanese application JP2022-145621, filed on Sep. 13, 2022, the content of which is hereby incorporated by reference into this application.

BACKGROUND OF THE INVENTION

1. Field of the Invention

The present invention relates generally to a technique of complying with a restriction imposed on data.

2. Description of Related Art

For example, a data analyst issues a query designating data of a desired item to a database system for data utilization. The database system includes a database for each organization. In execution of the query, data is input to and output from databases of one or more organizations.

It is desirable that the data can be used for a plurality of organizations. At this time, it is necessary to comply with a restriction imposed on the data. For example, techniques disclosed in PTLs 1 and 2 are known as a technique for complying with a restriction imposed on data.

CITATION LIST

Patent Literature

PTL 1: US2019/0228171
PTL 2: US2015/0302420

SUMMARY OF THE INVENTION

As a system for complying with a restriction imposed on data, a system is considered that executes query compliance check, which is check as to whether a query complies with a restriction imposed on data, before execution of the query. When the query compliance check is false (that is, when the query is compliance violation), typically, the query needs to be corrected at a query source (for example, a user side).

When resource utilization efficiency (computational resource utilization efficiency) for the query compliance check is low, the query compliance check takes a long time, and as a result, it takes a long time to start execution of the query or start correction of the query.

The query compliance check is roughly divided into data flow policy check as to whether a data flow policy is complied with and organization rule check as to whether an organization rule is complied with, which are hierarchically configured. The data flow policy defines a restriction on data transfer within a country or between countries and including data items permitted and/or prohibited to be transferred within a country or between countries. The organization rule defines a restriction imposed, based on a plurality of conditions, on data permitted to be shared outside an organization.

By analyzing a received query, a system identifies one or more data items as target input/output (I/O) data according to the query, and executes the data flow policy check on the identified one or more data items.

When a result of the data flow policy check is true, the system executes the organization rule check on the target I/O data according to the query. When a result of the organization rule check is false, the system returns a result that the query is compliance violation.

When the result of the data flow policy check is false, the system returns a result that the query is compliance violation without executing the organization rule check.

According to the invention, the resource utilization efficiency of the query compliance check is high.

BRIEF DESCRIPTION OF THE DRAWINGS

FIG. 3 shows a flow of query compliance check according to the first embodiment;
FIG. 4 shows a configuration of a query processing system according to a second embodiment;
FIG. 5 shows a configuration of a violation history table.

DESCRIPTION OF EMBODIMENTS

Figure 1:
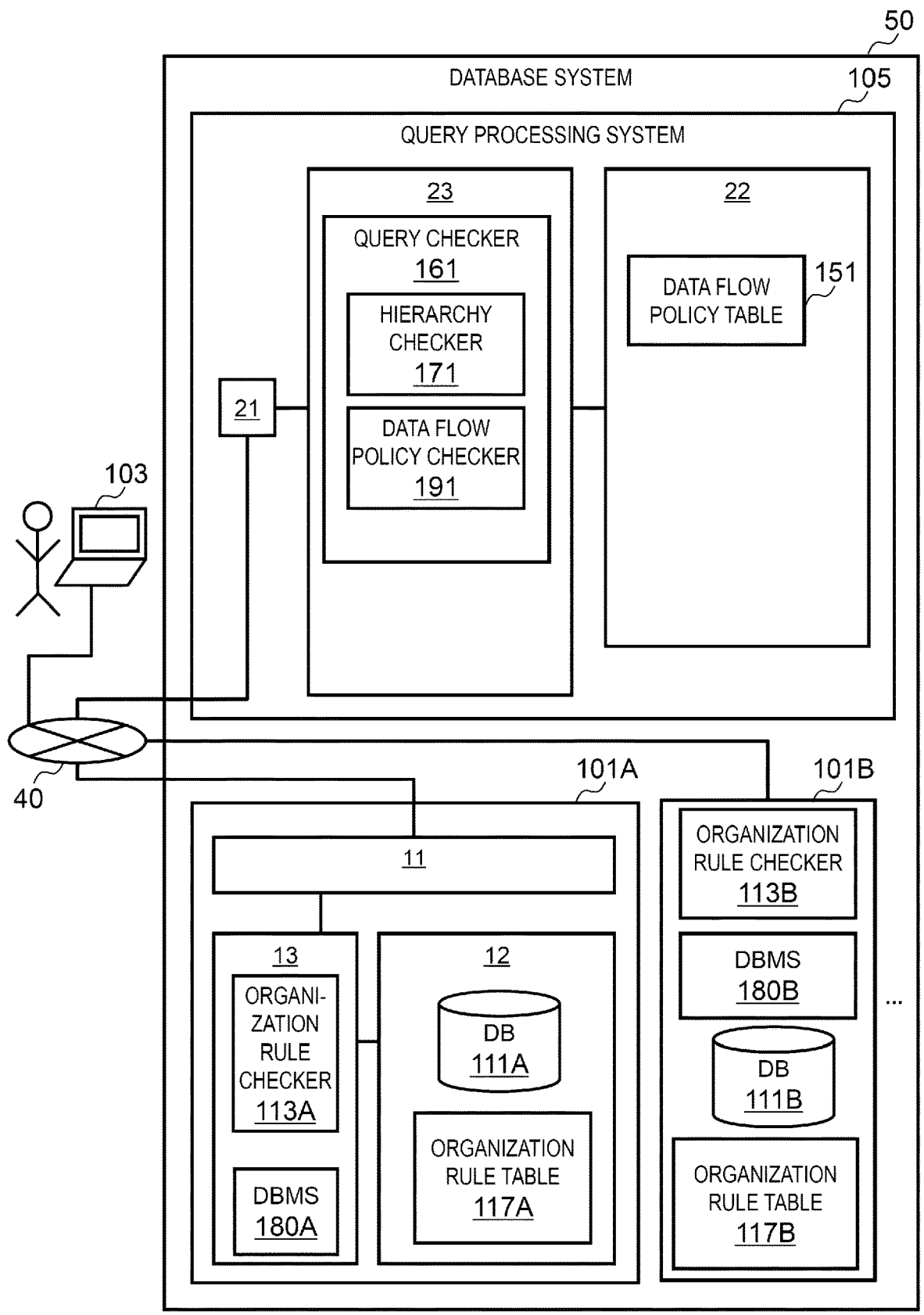
FIG. 1 shows an overall configuration of a system including a query processing system according to a first embodiment.

In the following description, the term "interface device" may be one or more interface devices. The one or more interface devices may be at least one of the following.

An I/O interface device that is one or more input/output (I/O) interface devices. The I/O interface device is an interface device for at least one of an I/O device and a remote display computer. The I/O interface device for the display computer may be a communication interface device. At least one I/O device may be a user interface device, for example, an input device such as a keyboard and a pointing device, or an output device such as a display device.

A communication interface device that is one or more communication interface devices. The one or more communication interface devices may be one or more communication interface devices of the same type (for example, one or more network interface cards (NICs)) or two or more communication interface devices of different types (for example, a NIC and a host bus adapter (HBA)).

In the following description, the term "memory" is one or more memory devices, which is an example of one or more storage devices, and may typically be a main storage device. At least one memory device in the memory may be a volatile memory device or a non-volatile memory device.

In the following description, the term "persistent storage device" may be one or more persistent storage devices, which is an example of one or more storage devices. The persistent storage device may typically be a non-volatile storage device (for example, an auxiliary storage device), and specifically, for example, a hard disk drive (HDD), a solid state drive (SSD), a non-volatile memory express (NVME) drive, or a storage class memory (SCM).

In the following description, the term "storage device" may be at least one of a memory and a persistent storage device.

In the following description, the term "processor" may be one or more processor devices. At least one processor device may typically be a microprocessor device such as a central processing unit (CPU), and may be another type of processor device such as a graphics processing unit (GPU). At least one processor device may be a single core or a multi-core. At least one processor device may be a processor core. At least one processor device may be a processor device in a broad sense, such as a circuit (for example, a field-programmable gate array (FPGA), a complex programmable logic device (CPLD), or an application specific integrated circuit (ASIC)), which is an aggregate of gate arrays in a hardware description language for executing a part or all of processing.

In the following description, a function referred to as a checker or a database management system (DBMS) may be described, and the function may be implemented by executing one or more computer programs by a processor, may be implemented by one or more hardware circuits (for example, an FPGA or an ASIC), or may be implemented by a combination thereof. When a function is implemented by executing a program by a processor, predetermined processing is executed using a storage device and/or an interface device, etc., as appropriate, and thus the function may be at least a part of the processor. The processing described with the function as a subject may be processing executed by the processor or a device including the processor. The program may be installed from a program source. The program source may be, for example, a program distribution computer or a computer-readable storage medium (for example, a non-transitory storage medium). Description of each function is an example, and a plurality of functions may be integrated into one function, or one function may be divided into a plurality of functions.

In the following description, a common reference numeral in reference numerals may be used when elements of the same type are described without distinction, and reference numerals may be used when elements of the same type are described with distinction.

Hereinafter, several embodiments of the invention will be described with reference to the drawings.

First Embodiment

FIG. 1 shows an overall configuration of a system including a query processing system according to a first embodiment.

A user terminal 103 and a database system 50 are connected to a communication network (for example, the Internet or a wide area network (WAN)) 40.

The user terminal 103 is an information processing terminal such as a personal computer or a smartphone, and is an example of a query source. A user (for example, an analyst) operates the user terminal 103 to issue one or more database queries. The query is, for example, an SQL query.

The database system 50 includes a query processing system 105 and a plurality of (or one) organization systems 101 (101A, 101B, . . . ) that communicate with the query processing system 105.

The organization system 101 is a computer system that inputs and outputs data managed by an organization. The organization system 101 is a physical computer system (one or more physical computers), or may be a logical computer system based on a physical computer system (for example, a cloud service system based on a cloud infrastructure). The organization system 101 includes an interface device 11, a storage device 12, and a processor 13 connected to the interface device 11 and the storage device 12.

The interface device 11 communicates with the query processing system 105 via the communication network 40.

The storage device 12 stores a database 111 and an organization rule table 117 (an example of organization rule information). In addition, the storage device 12 stores a computer program to be executed by the processor 13. The database 111 is managed by the organization and includes one or more tables. The table includes records and columns. The organization rule table 117 represents an organization rule. The organization rule is a rule that defines a restriction imposed, based on a plurality of conditions, on data permitted to be shared outside the organization.

The processor 13 executes the computer program to implement an organization rule checker 113 and a DBMS 180. The organization rule checker 113 executes organization rule check, which is check as to whether the organization rule represented by the organization rule table 117 is complied with. The DBMS 180 executes a query to be executed.

The query processing system 105 is a physical computer system, or may be a logical computer system based on a physical computer system (for example, a cloud service system based on a cloud infrastructure). For example, the query processing system 105 may be a server, and the user terminal 103 may be a client. The query processing system 105 includes an interface device 21, a storage device 22, and a processor 23 connected to the interface device 21 and the storage device 22.

The interface device 21 communicates with the user terminal 103 and the organization system 101 via the communication network 40.

The storage device 22 stores a data flow policy table 151 (an example of data flow policy information). In addition, the storage device 22 stores a computer program to be executed by the processor 23. The data flow policy table 151 represents a data flow policy. The data flow policy is a policy that defines a restriction on data transfer within a country or between countries and including data items permitted and/or prohibited to be transferred within a country or between countries.

The processor 23 executes the computer program to implement a query checker 161. The query checker 161 executes query compliance check. The query checker 161 includes a hierarchy checker 171 and a data flow policy checker 191. The hierarchy checker 171 executes hierarchy compliance check as an example of the query compliance check. The data flow policy checker 191 executes data flow policy check, which is executed in the query compliance check and is check as to whether the data flow policy is complied with.

Information representing the data flow policy may be input to the query processing system 105 from, for example, an information processing terminal of a system administrator via a UI such as a graphical user interface (GUI), and the data flow policy table 151 including the information may be stored in the storage device 22. The data flow policy may include one or more data item sets. The data item set is a plurality of (or one) data items, and includes one or more data items identified from the query. The data item set of the data flow policy includes, for example, all or a part of data items such as a table name, a column name, a transfer source country, a transfer destination country, presence or absence of aggregation, and presence or absence of masking. These data items, that is, the table name, the column name, the transfer source country, the transfer destination country, the presence or absence of aggregation, and the presence or absence of masking are identified from the query. The "data item" may include an item name (for example, a "column name") and an item value (for example, an "age"). In a case of data transfer within the country, the transfer source country and the transfer destination country are the same country.

For example, for each organization, information representing an organization rule may be input to the organization system 101 of the organization from, for example, an information processing terminal of an organization manager via a UI such as a GUI, and the organization rule table 117 including the information may be stored in the storage device 22. The organization rule typically defines a restriction that is more complicated than that defined in a data flow policy (for example, a restriction on a result of processing (for example, aggregation) of data read from a query).

Figure 2:
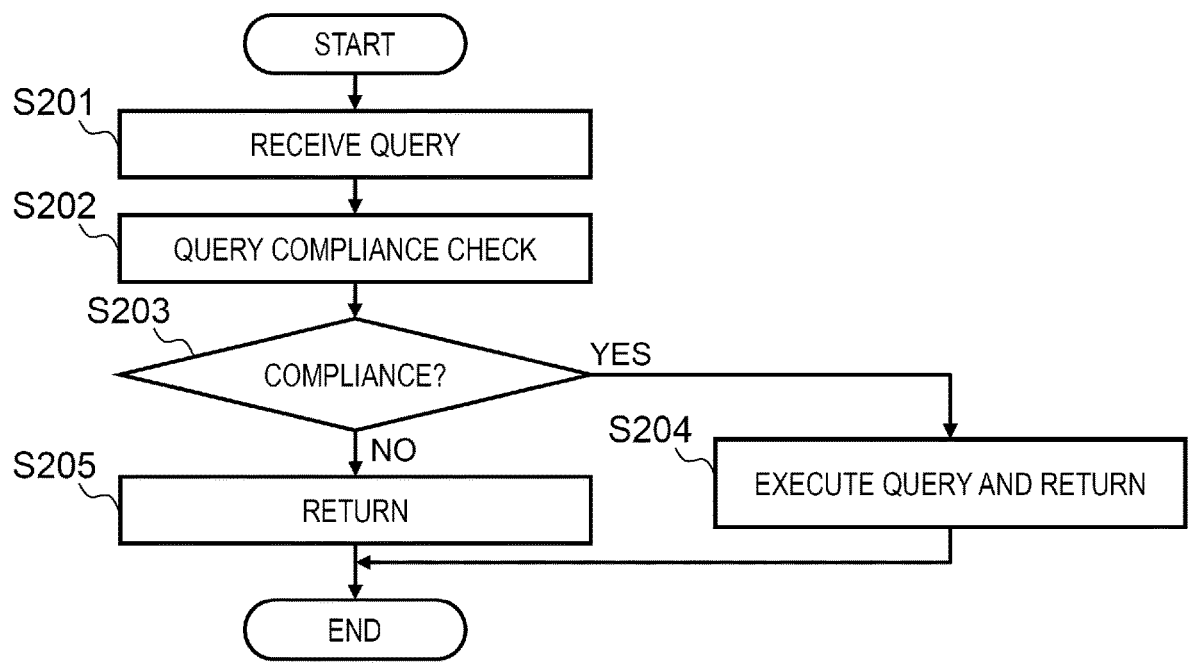
FIG. 2 shows an overall flow of query processing according to the first embodiment.

FIG. 2 shows an overall flow of query processing according to the first embodiment.

The query checker 161 receives a query from the user terminal 103 (S201). The query checker 161 executes query compliance check on the received query (S202).

When a result of the query compliance check (an overall check result to be described later) is compliance (S203: YES), the query checker 161 transmits the query received in S201 to the organization system 101 having target I/O data according to the query, the DBMS 180 of the organization system 101 executes the query, and the query checker 161 returns a query execution result to the user terminal 103 (S204).

When the result of the query compliance check is non-compliance (compliance violation) (S203: NO), the query is not to be executed. The query checker 161 returns a check result (a result of the query compliance check) indicating compliance violation to the user terminal 103 (S205).

FIG. 3 shows a flow of S202 (the query compliance check according to the first embodiment) in FIG. 2.

The hierarchy checker 171 runs. The hierarchy checker 171 acquires a query (S301). The hierarchy checker 171 analyzes the query (S302), thereby identifying one or more data items as target I/O data according to the query (S303). In the embodiment, the identified data item is a table name of a table in the database and/or a column name of a column in the table. The hierarchy checker 171 causes the data flow policy checker 191 to execute data flow policy check on the identified one or more data items (S304). In S304, for example, the data flow policy checker 191 checks whether a data item set matching the one or more data items identified from the query is present in a data flow policy. For example, when a data item set including a table name "employee", a column name "age", a transfer source country "P", and a transfer destination country "Q" is present in the data flow policy and the data items identified from the query are a table name "employee", a column name "age", a transfer source country "P", and a transfer destination country "Q", a result of the data flow policy check is true. For example, when the data items identified from the query are a table name "employee", a column name "name", a transfer source country "P", and a transfer destination country "Q", and no data item set matching all of these is present in the data flow policy (or, for example, when transfer of the column name "name" is prohibited for a set of the transfer source country "P" and the transfer destination country "Q"), the result of the data flow policy check is false.

When the result of the data flow policy check is true (S305: YES), the hierarchy checker 171 identifies the organization system 101 including the database 111 having target I/O data according to the query, and causes the organization rule checker 113 of the organization system 101 to execute organization rule check on the data. An example of the organization rule check is S306 to S308. For example, the organization rule checker 113 acquires data (for example, column data) by causing the DBMS 180 of the organization system 101 to temporarily execute the query (S306), and processes the acquired data according to, for example, description of the query (S307). The processing of S307 may be, for example, statistical processing on the acquired column data (for example, calculation of a total value, and identification of a maximum value and/or a minimum value). The organization rule checker 113 compares a data processing result with an organization rule represented by the organization rule table 117 to execute the organization rule check as to whether the organization rule is complied with (S308). The hierarchy checker 171 determines a result of query compliance check, that is, an overall check result, based on the result of the data flow policy check and a result of the organization rule check (S309). For the processing of S306 to S308, a technique disclosed in the US application (application Ser. No. 17/465,114) unpublished at the time of application of the present application (for example, processing of S302 to S307 in FIG. 9 of this US application) may be applied.

When the result of the data flow policy check is false (S305: NO), the hierarchy checker 171 executes S309 without causing the organization rule checker 113 to execute the organization rule check.

The overall check result determined in S309 is a result of whether the query is a compliance query or a non-compliance (compliance violation) query. The overall check result is a result that the query is compliance violation if the result of the organization rule check is false even if the result of the data flow policy check is true. In addition, the overall check result is a result that the query is compliance violation if the result of the data flow policy check is false. The overall check result may include, for example, the following.

Which of the data flow policy and the organization rule is not complied with.

When the data flow policy is not complied with, which data item in the query is violated.

When the organization rule is not complied with, which part of which organization rule the query is violated.

As described above, in the first embodiment, the query compliance check is roughly divided into the data flow policy check and the organization rule check, which are hierarchically configured.

The data flow policy check can be completed by comparing the data items identified from the query with the data flow policy (in other words, completed without executing data processing according to the query). In addition, the organization rule check may require data processing according to the query (for example, aggregation of data read according to the query, or statistical processing based on statistical information of a database and the query), consumes more computational resources than the data flow policy check, and requires a longer time than the data flow policy check. The organization rule check requires more computational resources and takes a longer time to process as the query and the organization rule are more complicated.

According to the first embodiment, first, data flow policy check is executed on one or more data items identified from a query. When a result of the data flow policy check is false, a check result that the query is compliance violation is returned without executing organization rule check. Therefore, it is possible to improve resource utilization efficiency of the query compliance check and to reduce overhead of preparing a query that is not compliance violation.

According to the first embodiment, the organization system 101 of an organization includes the organization rule checker 113 that executes organization rule check as to whether an organization rule of the organization is complied with. In general, the organization rule and the organization rule check differ from organization to organization. The complexity of the organization rule check varies depending on the organization rule and the query. According to the embodiment, it is unnecessary to prepare an organization rule checker in the query processing system 105 for each organization, and therefore a burden of constructing the query processing system 105 can be reduced. In addition, since a processing load of the organization rule check is high and such organization rule check is executed outside the query processing system 105, slowing down the query compliance check executed by the query processing system 105 can be avoided.

The first embodiment has been described above. Second to fourth embodiments will be described below. In this case, differences from the first embodiment will be mainly described, and description of common points with the first embodiment will be omitted or simplified.

In the second to fourth embodiments, the query checker 161 includes a naive checker that causes at least the organization rule checker 113 to run in addition to the hierarchy checker 171 that causes at least the data flow policy checker 191 to run. When the naive checker runs and the naive checker causes the data flow policy checker 191 to run, the naive checker causes the data flow policy checker 191 and the organization rule checker 113 to run in parallel.

The query checker 161 selects the hierarchy checker 171 or a naive checker 172 to run, and causes the selected checker to run. In processing executed by the hierarchy checker 171, running necessity of the organization rule checker 113 depends on a result of the data flow policy check, while in processing executed by the naive checker 172, running necessity of the data flow policy checker 191 is independent from a result of the organization rule check. Accordingly, it can be expected to improve both resource utilization efficiency and accuracy of query compliance check. For example, when a certain query requires execution by the organization rule checker 113, it is expected that for the certain query, the naive checker takes less time for the query compliance check, instead of the hierarchy checker 171 that causes execution by the organization rule checker 113 after the data flow policy checker 191.

Second Embodiment

FIG. 4 shows a configuration of a query processing system according to the second embodiment.

The query checker 161 includes the naive checker 172 and a controller 173 in addition to the hierarchy checker 171 and the data flow policy checker 191. The storage device 22 stores a violation history table 400.

The controller 173 calculates at least one of a policy violation rate and a rule violation rate, and selects the hierarchy checker 171 or the naive checker 172 to run based on the calculated violation rate. Accordingly, one of the hierarchy checker 171 and the naive checker 172 suitable for the violation rate runs.

FIG. 5 shows a configuration of the violation history table 400.

The violation history table 400 represents a total number "Z" of non-compliance queries, a number "X" of non-compliance queries with a data flow policy, and a number "Y" of non-compliance queries with an organization rule. The value "Z" is incremented each time a query is present that does not comply with either the data flow policy or the organization rule. The value "X" is incremented each time a query is present that does not comply with the data flow policy. The value "Y" is incremented each time a query is present that does not comply with the organization rule.

The controller 173 manages (calculates) at least one of a policy violation rate and a rule violation rate. The policy violation rate is a ratio of the number "X" of queries for which a result of data flow policy check is false to the number "Z" of compliance violation queries. The rule violation rate is a ratio of the number "Y" of queries for which a result of organization rule check is false to the number "Z" of the compliance violation queries. The controller 173 selects the hierarchy checker 171 or the naive checker 172 to run based on the calculated violation rate.

Figure 6:
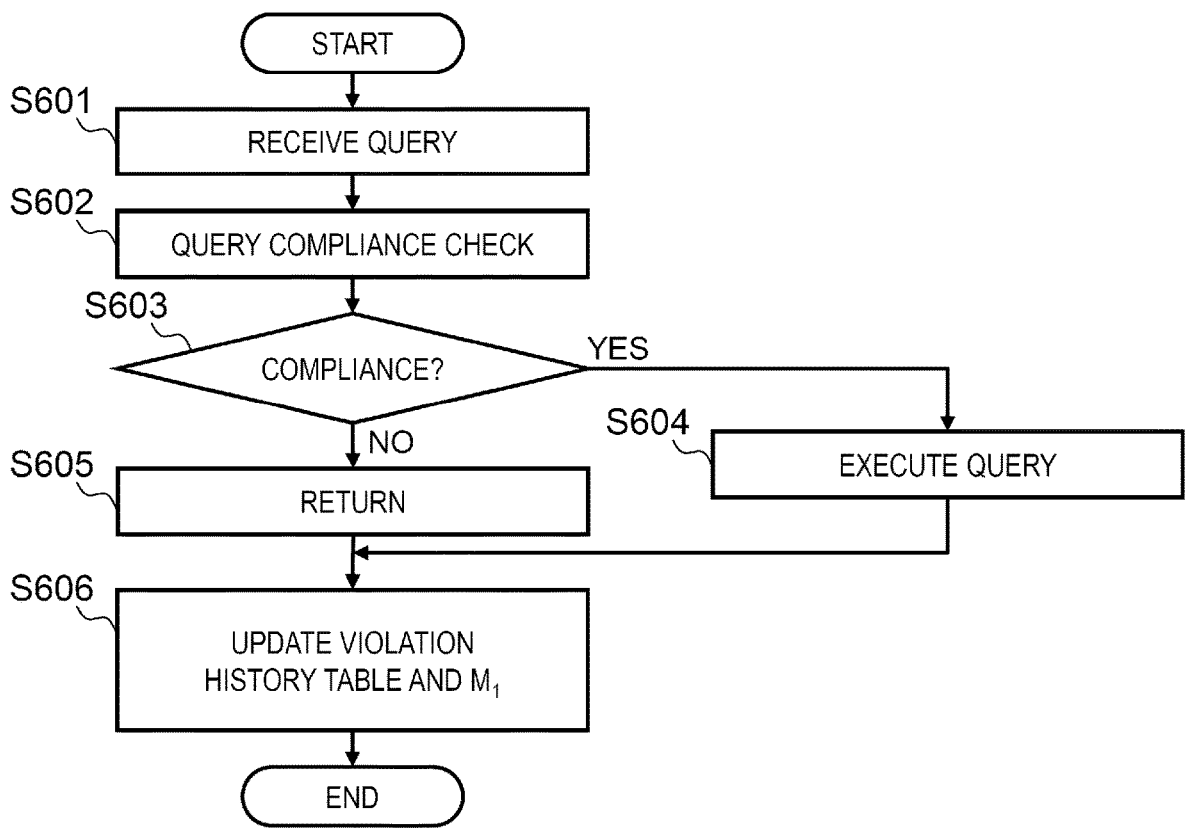
FIG. 6 shows an overall flow of query processing according to the second embodiment.

FIG. 6 shows an overall flow of query processing according to the second embodiment. In the embodiment, the naive checker 172 causes both the data flow policy checker 191 and the organization rule checker 113 to run.

The query checker 161 receives a query from the user terminal 103 (S601). The query checker 161 executes query compliance check on the received query (S602).

When a result of the query compliance check is compliance (S603: YES), the query checker 161 transmits the query received in S601 to the organization system 101 having target I/O data according to the query, the DBMS 180 of the organization system 101 executes the query, and the query checker 161 returns a query execution result to the user terminal 103 (S604).

When the result of the query compliance check is non-compliance (compliance violation) (S603: NO), the query is not to be executed. The query checker 161 returns a check result indicating compliance violation to the user terminal 103 (S605). The controller 173 updates the value "X" or "Y" depending on which of the data flow policy and the organization rule is not complied with, and updates the value "Z" (a sum of X and Y). That is, the controller 173 updates the violation history table 400 (S606). In S606, the controller 173 further executes the following updates. As described below, which of the hierarchy checker 171 and the naive checker 172 is selected can be expressed by, for example, one bit. A bit $M_1$ is stored in the storage device 22.

The controller 173 sets a value of $M_1$ to "0" when the policy violation rate is equal to or greater than a first threshold $T_1$ (or when the rule violation rate is equal to or smaller than a second threshold $T_2$).

The controller 173 sets the value of $M_1$ to "1" when the policy violation rate is smaller than the first threshold $T_1$ (or when the rule violation rate is greater than the second threshold $T_2$).

The first threshold $T_1$ may be a manually set value (for example, a value set by the system administrator or the user) or a value determined by the controller 173 based on the rule violation rate (for example, the rule violation rate itself). Similarly, the second threshold $T_2$ may be a manually set value or a value determined by the controller 173 based on the policy violation rate (for example, the policy violation rate itself).

Figure 7:
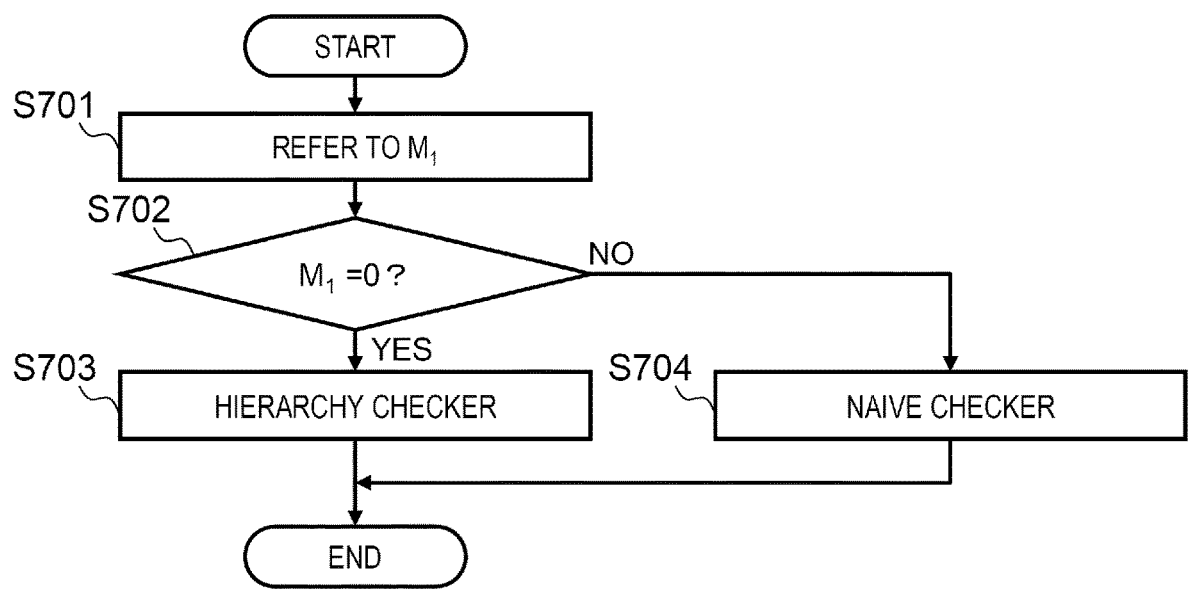
FIG. 7 shows a flow of query compliance check according to the second embodiment.

FIG. 7 shows a flow of S602 (the query compliance check according to the second embodiment) in FIG. 6.

The controller 173 refers to $M_1$ (S701) and determines whether $M_1$ is "0" (S702).

When a determination result in S702 is true (S702: YES), the controller 173 selects the hierarchy checker 171 and causes the hierarchy checker 171 to run (S703). When the determination result in S702 is false (S702: NO), the controller 173 selects the naive checker 172 and causes the naive checker 172 to run (S704).

According to the embodiment, when the policy violation rate is high, the hierarchy checker 171 that does not necessarily cause the organization rule checker 113 to run runs. In addition, when the rule violation rate is high, a running possibility of the organization rule checker 113 is high, and thus the naive checker 172 that causes the data flow policy checker 191 to run in parallel with the organization rule checker 113 runs. In this way, appropriate query compliance check according to the calculated violation rate, that is, query compliance check with high resource utilization efficiency is executed.

Third Embodiment

Figures 8, 9:
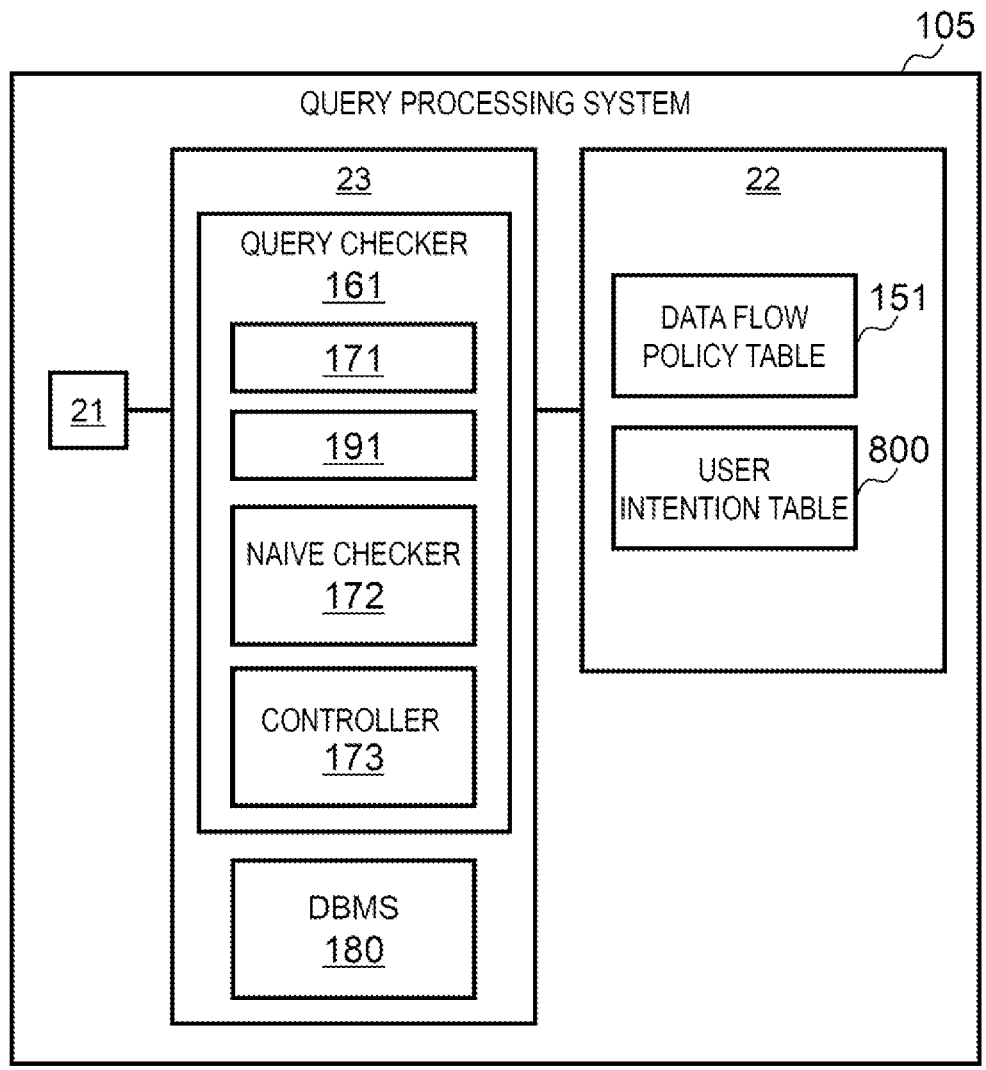
FIG. 8 shows a configuration of a query processing system according to a third embodiment.
FIG. 9 shows a configuration of a user intention table.

FIG. 8 shows a configuration of a query processing system according to the third embodiment.

The query checker 161 includes the naive checker 172 and the controller 173 in addition to the hierarchy checker 171 and the data flow policy checker 191. The storage device 22 stores a user intention table 800 (an example of user intention information) representing a user intention.

The "user intention" referred to in the embodiment is the kind of query compliance check to be executed. The controller 173 selects the hierarchy checker 171 or the naive checker 172 to run according to the user intention represented by the user intention table 800. Accordingly, the query compliance check according to the user intention can be executed.

FIG. 9 shows a configuration of the user intention table 800.

According to the user intention table 800, four variations are present in the query compliance check, and the four variations are expressed by two bits $M_1$ and $M_2$.

Similar to the second embodiment, $M_1$ means which of the hierarchy checker 171 and the naive checker 172 runs. Specifically, "0" means the hierarchy checker 171, and "1" means the naive checker 172.

$M_2$ means which of the data flow policy check and the organization rule check is to be executed. Specifically, "1" means only the data flow policy check, and "0" means only the organization rule check.

The user intention table 800 indicates according to which of the four variations the user intends to execute the query compliance check. According to the user intention table 800 shown in FIG. 9, the user intention is $(M_1, M_2)=(0, 1)$, that is, the hierarchy checker 171 runs and only the data flow policy check is to be executed. In this case, the organization rule check is not to be executed regardless of a result of the data flow policy check.

Figure 10:
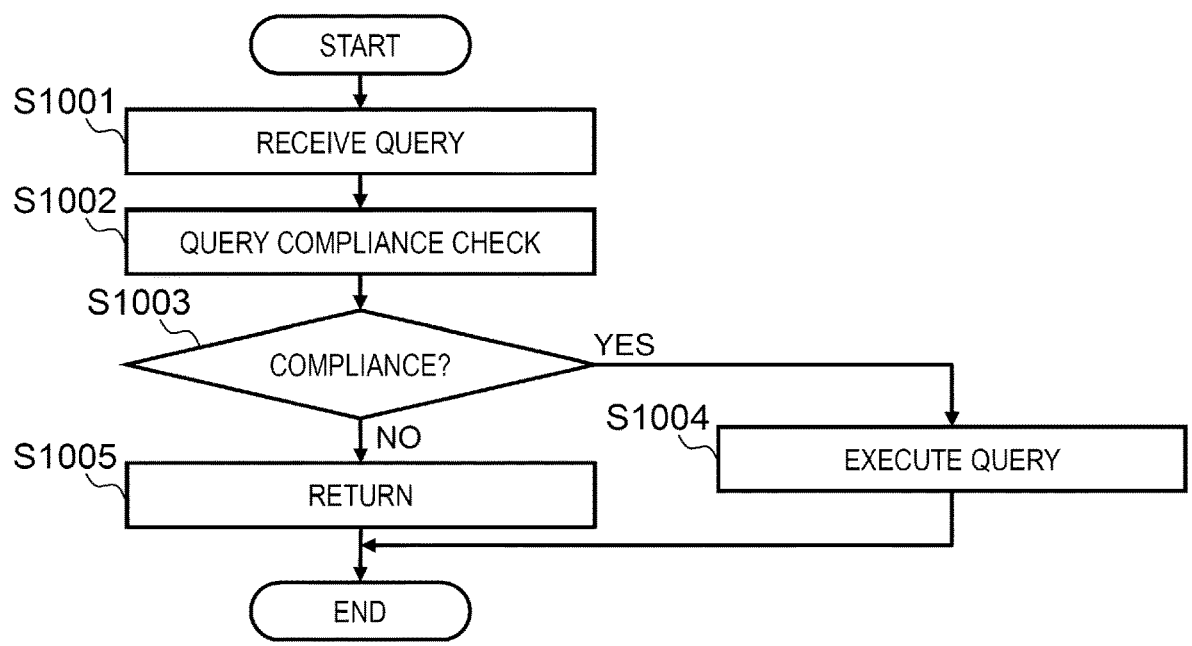
FIG. 10 shows an overall flow of query processing according to the third embodiment.

FIG. 10 shows an overall flow of query processing according to the third embodiment.

Figure 11:
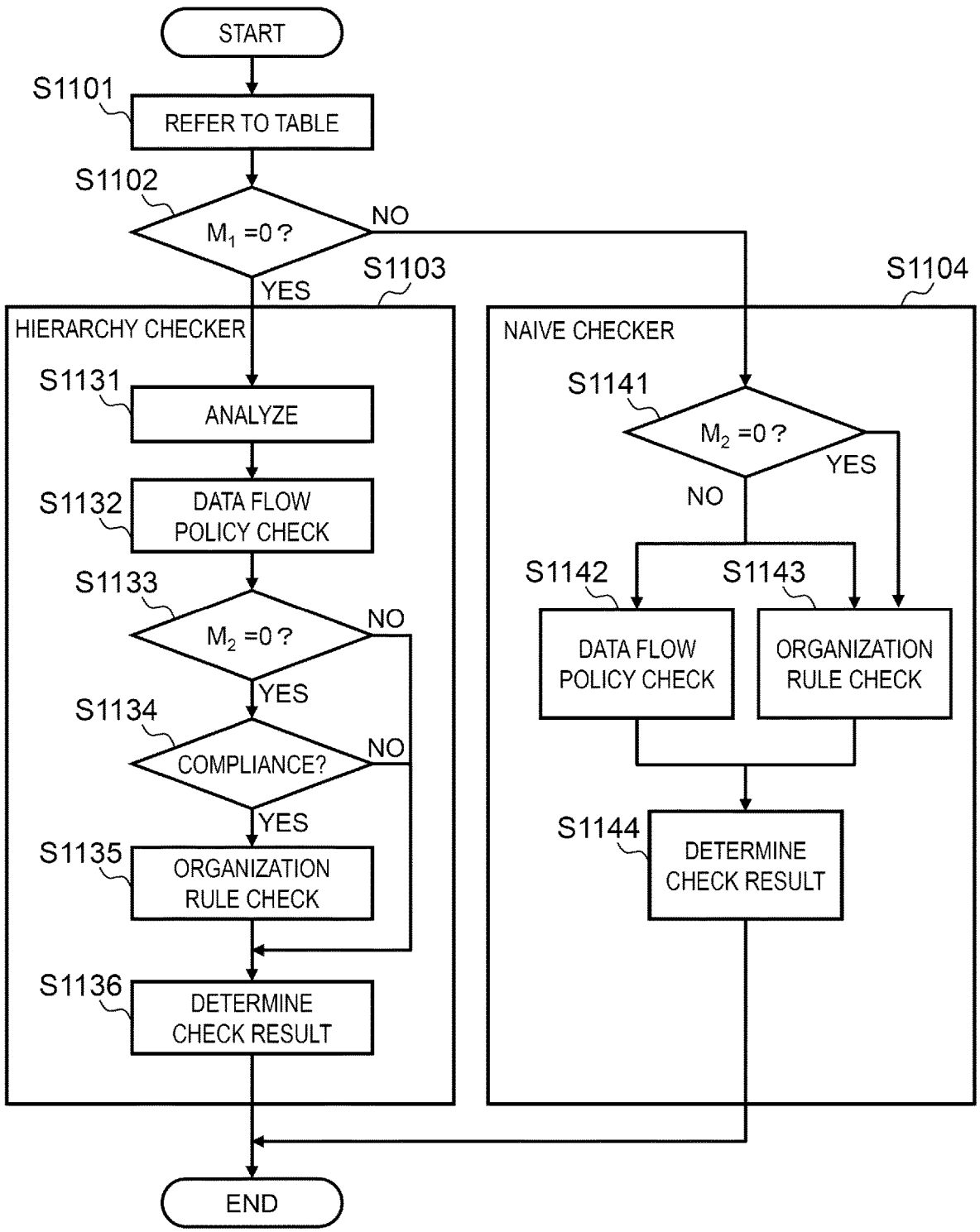
FIG. 11 shows a flow of query compliance check according to the third embodiment.

S1001 and S1003 to S1005 are similar to S201 and S203 to S205 according to the first embodiment. As shown in FIG. 11, S1002 is different from S202 according to the first embodiment.

FIG. 11 shows a flow of S1002 (query compliance check according to the third embodiment) in FIG. 10.

The controller 173 refers to the user intention table 800 (S1101) and identifies a user intention. The controller 173 determines whether $M_1$ is "0" in the identified user intention (S1102).

When a determination result in S1102 is true (S1102: YES), the controller 173 selects the hierarchy checker 171 and causes the hierarchy checker 171 to run (S1103). On the other hand, when a determination result in S1102 is false (S1102: NO), the controller 173 selects the naive checker 172 and causes the naive checker 172 to run (S1104). Details of S1103 and S1104 are as follows.

Details of S1103

The hierarchy checker 171 analyzes a query (S1131), identifies one or more data items as target I/O data according to the query, and causes the data flow policy checker 191 to execute data flow policy check on the identified one or more data items (S1132).

Next, the hierarchy checker 171 determines whether $M_2$ is "0" in the user intention (S1133). When a determination result in S1133 is false (S1133: NO), that is, when the user intention is to implement the hierarchy checker 171 and execute only the data flow policy check, the hierarchy checker 171 does not cause organization rule check to be executed regardless of a result of the data flow policy check. The hierarchy checker 171 determines an overall check result without execution of the organization rule check (S1136).

When the determination result in S1133 is true (S1133: YES), that is, when the user intention is to implement the hierarchy checker 171 and execute only the organization rule check, the organization rule checker 113 is caused to execute the organization rule check according to a result of the data flow policy check, similar to the first embodiment. Specifically, when the result of the data flow policy check is false (S1134: NO), the hierarchy checker 171 determines an overall check result without execution of the organization rule check (S1136). On the other hand, when the result of the data flow policy check is true (S1134: YES), the hierarchy checker 171 causes the organization rule check to be executed (S1135), and determines an overall check result based on results of the data flow policy check and the organization rule check (S1136).

Details of S1104

The naive checker 172 determines whether $M_2$ is "0" in the user intention (S1141).

When a determination result in S1141 is true (S1141: YES), that is, when the user intention is to implement the naive checker 172 and execute only the organization rule check, the naive checker 172 causes the organization rule checker 113 to execute the organization rule check (S1143), but does not cause the data flow policy checker 191 to execute the data flow policy check. In this case, the naive checker 172 determines an overall check result based on a result of the organization rule check (S1144).

On the other hand, when the determination result in S1141 is false (S1141: NO), that is, when the user intention is to implement the naive checker 172 and execute only the data flow policy check, the naive checker 172 causes the data flow policy checker 191 to execute the data flow policy check (S1142), and causes the organization rule checker 113 to execute the organization rule check in parallel (S1143). In this case, the naive checker 172 determines an overall check result based on results of the data flow policy check and the organization rule check (S1144).

According to the embodiment, four variations are prepared for the query compliance check, and it is possible to implement variations according to the user intention among the four variations.

Fourth Embodiment

Figure 12:
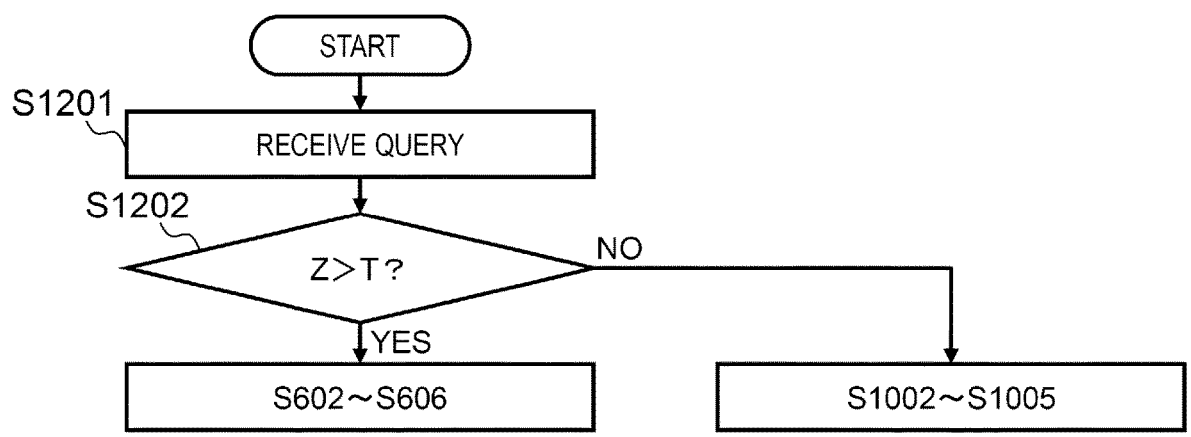
FIG. 12 shows an overall flow of query processing according to a fourth embodiment.

FIG. 12 shows an overall flow of query processing according to the fourth embodiment.

The embodiment is based on a combination of the second embodiment and the third embodiment. The query checker 161 receives a query (S1201), and the controller 173 determines whether the value "Z" (the number of compliance violation queries) is greater than a certain number T (S1202).

When a determination result in S1202 is true (S1202: YES), that is, when a history of compliance violation is sufficient, check based on a violation rate, that is, S602 to S606 in FIG. 6 is to be executed.

On the other hand, when the determination result in S1202 is false (S1202: NO), that is, when a history of compliance violation is insufficient, check according to a user intention, that is, S1002 to S1005 in FIG. 10 is to be executed.

According to the embodiment, when the history of compliance violation is not sufficient to select an appropriate checker corresponding to a violation rate from the hierarchy checker 171 and the naive checker 172, query compliance check according to the user intention is executed, including selecting a checker according to the user intention from the hierarchy checker 171 and the naive checker 172. Therefore, even if the history of compliance violation is insufficient, the query compliance check including appropriate checker selection can be expected.

Although several embodiments have been described above, these embodiments are merely examples for describing the invention, and are not intended to limit the scope of the invention only to these embodiments. The invention can be implemented in various other forms.

For example, the invention is also applicable to queries for object sets that are not limited to databases. The object set is one or more objects. In the above embodiments, the object set may be the DB 111 or a table in the DB 111, and the object may be a record and/or a column in the table. The object may be a file in a file system space provided by a file storage, in which case an example of a data item identified in data flow policy check may be a filename.

For example, a query source may be an application executed inside or outside the query processing system 105 instead of or in addition to the user terminal 103.

For example, the DBMS 180 may be provided in the query processing system 105 instead of the organization system 101.

For example, for at least one organization system 101, the organization rule checker 113 may be provided in the query processing system 105. The organization rule checker 113 provided in the query processing system 105 may be common to two or more organizations.

What is claimed is:

1. A query processing system comprising:
an interface device configured to receive a query;
a storage device configured to store data flow policy information of a data flow policy; and
a processor connected to the interface device and the storage device, wherein the data flow policy is a policy that defines a first restriction on data transfer within a country or between countries and includes specific data items, among a plurality of data items, that are permitted and/or prohibited to be transferred within the country or between the countries, wherein the processor is configured to:

execute a hierarchy checker to identify one or more data items within the query as target input/output (I/O) data by analyzing the query, execute a data flow policy checker to execute a data flow policy check on the identified one or more data items, when a result of the data flow policy check is true, execute an organization rule checker to execute an organization rule check on the target I/O data according to the query, when a result of the organization rule check is false, return a result indicating that the query is a compliance violation, and when the result of the data flow policy check is false, return a result indicating that the query is the compliance violation without executing the organization rule checker to execute the organization rule check, and wherein for the identified one or more data items, the data flow policy check is a determination as to whether the identified one or more data items comply with the data flow policy information, wherein for the target I/O data, the organization rule check is a determination as to whether the target I/O data complies with an organization rule indicated by organization rule information of an organization that manages the target I/O data, wherein the organization rule is a rule that defines a second restriction imposed, based on a plurality of conditions, on the target I/O data permitted to be shared outside the organization, wherein the processor is configured to select the hierarchy checker, which executes at least the data flow policy checker, or a naive checker, which executes at least the organization rule checker, wherein in processing executed by the hierarchy checker, whether to execute the organization rule checker depends on the result of the data flow policy check, wherein, in processing executed by the naive checker, whether to execute the data flow policy checker is independent of the result of the organization rule check, and wherein when the naive checker is executed and the naive checker causes the data flow policy checker to execute, the naive checker causes the data flow policy checker and the organization rule checker to be executed in parallel.

2. The query processing system according to claim 1, wherein the processor is configured to:
calculate at least one of a policy violation rate and a rule violation rate, and
select the hierarchy checker or the naive checker to execute based on the calculated violation rate,
wherein the policy violation rate is a ratio of a number of queries for which the result of the data flow policy check is false to a number of compliance violation queries, and
wherein the rule violation rate is a ratio of a number of queries for which the result of the organization rule check is false to the number of compliance violation queries.

3. The query processing system according to claim 2, wherein the processor is configured to:

select the hierarchy checker when the policy violation rate is equal to or greater than a first threshold, or when the rule violation rate is equal to or smaller than a second threshold, and select the naive checker when the policy violation rate is smaller than the first threshold or when the rule violation rate is greater than the second threshold.

4. The query processing system according to claim 1, wherein user intention information indicating a user intention is stored in the storage device, and wherein the processor is configured to select the hierarchy checker or the naive checker to execute according to the user intention indicated by the user intention information.

5. The query processing system according to claim 4, wherein the user intention indicates the following (A) and (B):

(A) execute the hierarchy checker or the naive checker, and (B) execute only one of the data flow policy check and the organization rule check, wherein when (A) indicates to run the hierarchy checker and (B) indicates to execute only the data flow policy check, the hierarchy checker is executed, and the organization rule checker is not caused to execute even if the result of the data flow policy check is true in the processing executed by the hierarchy checker, wherein when (A) indicates to execute the hierarchy checker and (B) represents to execute only the organization rule check, the hierarchy checker executes, and the organization rule checker is executed if the result of the data flow policy check is true in the processing executed by the hierarchy checker, wherein when (A) indicates to execute the organization rule checker and (B) indicates to execute only the data flow policy check, the naive checker is executed, and both the data flow policy checker and the organization rule checker are caused to be executed by the processing executed by the naive checker, and wherein when (A) indicates to execute the organization rule checker and (B) indicates to execute only the organization rule check, the naive checker is executed, and the organization rule checker is caused to executed without causing the data flow policy checker to be executed by the processing executed by the naive checker.

6. The query processing system according to claim 1, wherein an organization system of the organization is connected to the interface device, and wherein the organization system is a computer system configured to input and output data managed by the organization, and includes the organization rule checker that executes the organization rule check as to whether the organization rule of the organization is complied with.

7. The query processing system according to claim 1, wherein the identified one or more data items are a table name of a table in a database and/or a column name of a column in the table.

8. The query processing system according to claim 1, wherein the processor is configured to calculate at least one of a policy violation rate and a rule violation rate, wherein user intention information indicating a user intention is stored in the storage device, and wherein the processor is configured to:

determine whether the number of compliance violation queries is greater than a predetermined number, when a result of the determination is true, select the hierarchy checker or the naive checker to execute based on the calculated violation rate, and when the result of the determination is false, select the hierarchy checker or the naive checker to execute according to the user intention represented by the user intention information, wherein the policy violation rate is a ratio of the number of queries for which the result of the data flow policy check is false to the number of compliance violation queries, and wherein the rule violation rate is a ratio of the number of queries for which the result of the organization rule check is false to the number of compliance violation queries.

9. A query processing method comprising:

identifying one or more data items within a received query as target input/output (I/O) data by analyzing the query by a computer;

executing a data flow policy check on the identified one or more data items by the computer;

when a result of the data flow policy check is true, executing an organization rule check on the target I/O data according to the query by the computer;

when a result of the organization rule check is false, returning a result that the query is a compliance violation by the computer; and when the result of the data flow policy check is false, returning a result that the query is the compliance violation without executing the organization rule check by the computer, wherein for the identified one or more data items, the data flow policy check is a determination as to whether the identified one or more data items comply with a data flow policy indicated by data flow policy information, wherein the data flow policy is a policy that defines a first restriction on data transfer within a country or between countries and includes specific data items, among a plurality of data items, that are permitted and/or prohibited to be transferred within the country or between the countries, for the target I/O data according to the query, the organization rule check is a determination as to whether the data complies with an organization rule indicated by organization rule information of an organization that manages the data, wherein the organization rule is a rule that defines a second restriction imposed, based on a plurality of conditions, on the target I/O data permitted to be shared outside the organization, wherein the hierarchy checker, which executes at least the data flow policy checker, or a naive checker, which executes at least the organization rule checker, is selected, wherein in processing executed by the hierarchy checker, whether to execute the organization rule checker depends on the result of the data flow policy check, wherein, in processing executed by the naive checker, whether to execute the data flow policy checker is independent of the result of the organization rule check, and wherein when the naive checker is executed and the naive checker causes the data flow policy checker to execute, the naive checker causes the data flow policy checker and the organization rule checker to be executed in parallel.

10. A non-transitory computer readable medium storing a computer program that when executed by the computer, causes a computer to execute steps comprising:

identify one or more data items as target input/output (I/O) data according to a received query by analyzing the query, execute a data flow policy check on the identified one or more data items, when a result of the data flow policy check is true, execute an organization rule check on the target I/O data according to the query, when a result of the organization rule check is false, return a result that the query is a compliance violation, and when the result of the data flow policy check is false, return a result that the query is the compliance violation without executing the organization rule check, wherein for the identified one or more data items, the data flow policy check is a determination as to whether the one or more data items comply with a data flow policy indicated by data flow policy information, wherein the data flow policy is a policy that defines a first restriction on data transfer within a country or between countries and includes data items, among a plurality of data items, that are permitted and/or prohibited to be transferred within the country or between the countries, wherein for the target I/O data according to the query, the organization rule check is a determination as to whether the data complies with an organization rule indicated by organization rule information of an organization that manages the target I/O data, and wherein the organization rule is a rule that defines a second restriction imposed, based on a plurality of conditions, on the target I/O data permitted to be shared outside the organization, wherein the hierarchy checker, which executes at least the data flow policy checker, or a naive checker, which executes at least the organization rule checker is selected, wherein in processing executed by the hierarchy checker, whether to execute the organization rule checker depends on the result of the data flow policy check, wherein, in processing executed by the naive checker, whether to execute the data flow policy checker is independent of the result of the organization rule check, and wherein when the naive checker is executed and the naive checker causes the data flow policy checker to execute, the naive checker causes the data flow policy checker and the organization rule checker to be executed in parallel.

* * * * *